US009690833B2

(12) United States Patent
Barve et al.

(10) Patent No.: US 9,690,833 B2
(45) Date of Patent: Jun. 27, 2017

(54) SYSTEM AND METHOD FOR TEXT DISAMBIGUATION AND CONTEXT DESIGNATION IN INCREMENTAL SEARCH

(71) Applicant: Veveo, Inc., Andover, MA (US)

(72) Inventors: Rakesh Barve, Bangalore (IN); Sashikumar Venkataraman, Andover, MA (US); Murali Aravamudan, Andover, MA (US); Manish Mohan Sharma, Ghaziabad (IN); Pankaj Garg, Patiala (IN); Sankar Ardhanari, Windham, NH (US)

(73) Assignee: VEVEO, INC., Andover, MA (US)

( * ) Notice: Subject to any disclaimer, the term of this patent is extended or adjusted under 35 U.S.C. 154(b) by 0 days.

(21) Appl. No.: 15/166,118

(22) Filed: May 26, 2016

(65) Prior Publication Data
US 2016/0350388 A1 Dec. 1, 2016

Related U.S. Application Data

(63) Continuation of application No. 14/473,437, filed on Aug. 29, 2014, now Pat. No. 9,355,182, which is a continuation of application No. 14/039,395, filed on Sep. 27, 2013, now Pat. No. 8,826,179, which is a (Continued)

(51) Int. Cl.
G06F 3/048 (2013.01)
G06F 17/30 (2006.01)
G06F 3/023 (2006.01)

(52) U.S. Cl.
CPC ...... *G06F 17/30554* (2013.01); *G06F 3/0237* (2013.01); *G06F 3/048* (2013.01); *G06F 17/3064* (2013.01); *G06F 17/3097* (2013.01); *G06F 17/30171* (2013.01); *G06F 17/30312* (2013.01); *G06F 17/30867* (2013.01)

(58) Field of Classification Search
CPC .................................................. G06F 3/0237
USPC ........................................................ 715/816
See application file for complete search history.

(56) References Cited

U.S. PATENT DOCUMENTS 8,296,294 B2 * 10/2012 Barve ............... G06F 17/30011
707/727
8,756,527 B2 * 6/2014 Paasovaara ........... G06F 3/0237
715/773
(Continued)

*Primary Examiner* — William Titcomb
(74) *Attorney, Agent, or Firm* — Ropes & Gray LLP

(57) ABSTRACT

Methods and systems for text disambiguation and context designation in incremental search are provided. A method for selecting items in response to ambiguous keystrokes entered by a user and unambiguous metadata associated with a previously selected search result includes receiving ambiguous keystrokes, selecting and presenting a first subset of items and metadata associated with the items presented based on the ambiguous keystrokes. The method also includes receiving a selection of one of the items from the user, and, in response to a locking operation received from the user, locking in fixed relation at least one of the ambiguous keystrokes to at least one metadata term associated with the selected item. The method further includes, subsequent to receiving the locking operation, selecting and presenting a second subset of items based at least in part on the locked metadata term, and presenting the second subset of items.

20 Claims, 6 Drawing Sheets

Related U.S. Application Data continuation of application No. 12/126,549, filed on May 23, 2008, now Pat. No. 8,549,424.

(60) Provisional application No. 60/940,244, filed on May 25, 2007.

(56) References Cited

U.S. PATENT DOCUMENTS

| | | | |
|---|---|---|---|
| 8,918,736 B2* | 12/2014 | Jobs | G06F 3/0233 |
| | | | 345/156 |
| 9,009,624 B2* | 4/2015 | Bi | G06F 3/04886 |
| | | | 715/816 |
| RE45,566 E* | 6/2015 | Anderson | G06F 1/1626 |
| 2005/0246324 A1* | 11/2005 | Paalasmaa | G06F 17/30864 |
| 2007/0182595 A1* | 8/2007 | Ghasabian | G06F 1/1615 |
| | | | 341/22 |
| 2008/0114743 A1* | 5/2008 | Venkataraman | G06F 17/30657 |
| 2015/0178394 A1* | 6/2015 | Barve | G06F 3/0237 |
| | | | 715/816 |

* cited by examiner

SYSTEM AND METHOD FOR TEXT DISAMBIGUATION AND CONTEXT DESIGNATION IN INCREMENTAL SEARCH

CROSS-REFERENCE TO RELATED APPLICATIONS

This application is a continuation of U.S. patent application Ser. No. 14/473,437, entitled System and Method for Text Disambiguation and Context Designation in Incremental Search, filed on Aug. 29, 2014, which is a continuation of U.S. patent application Ser. No. 14/039,395, entitled System and Method for Text Disambiguation and Context Designation in Incremental Search, filed Sep. 27, 2013, now U.S. Pat. No. 8,826,179, which is a continuation of U.S. patent application Ser. No. 12/126,549, entitled System and Method for Text Disambiguation and Context Designation in Incremental Search, filed May 23, 2008, now U.S. Pat. No. 8,549,424, which claims the benefit under 35 U.S.C. §119(e) of U.S. Patent Application No. 60/940,244, entitled System and Method for Text Disambiguation and Context Designation in Incremental Search, filed May 25, 2007, the contents of each of which are incorporated by reference herein.

BACKGROUND

Field of the Invention

The present invention relates to user interfaces for searching and browsing and, more specifically, to user interfaces that are intended to operate on input-constrained devices and to provide relevant search results with a minimum of user interaction.

Discussion of Related Art

Discovery of desired content is not always simple as searching for a person, place or object and selecting the desired results. The user's intent may be deeper and broader, and retrieving the desired results might require more than merely providing more search terms. For example, a user may want to first discover a particular person, place, or entity, then browse through results in that context, and finally, make further refinements. In this case, the search system would need to be able to infer that the user is searching or browsing in a particular context, and serve content related to that context that satisfies the user's intent. A user progressively adding additional search terms may be misinterpreted as an attempt to intersect multiple interests rather than as a context based search. Some search engines have attempted to define specific grammars for users to specify a context search, but these grammars are often complex and idiosyncratic, and thus only experienced and advanced users can use them effectively. The expression and discovery of intent is further complicated by the possibility that a query may be entered using ambiguous keypad input (e.g., typed on a cellular phone using ambiguous keys).

SUMMARY OF THE INVENTION

The invention provides methods of and systems for text disambiguation and context designation in incremental search.

Under one aspect of the invention, a user-interface method for selecting a subset of items from a relatively large set of items in response to search criteria including ambiguous keystrokes entered by a user from a keypad with overloaded keys and including unambiguous metadata associated with a previously selected search result includes receiving ambiguous keystrokes entered by a user from a keypad with overloaded keys. A given key of the keypad is in fixed association with a plurality of alphabetical and numerical symbols the user is using to search for desired items. In response to receiving the ambiguous keystrokes, the method selects and presents a first subset of items and corresponding unambiguous metadata associated with the items presented based on the ambiguous keystrokes. The method also includes receiving a selection of one of the items of the first subset of items from the user, and, in response to a locking operation received from the user, locking in fixed relation at least one of the ambiguous keystrokes to at least one unambiguous metadata term associated with the selected item. The method further includes, subsequent to receiving the locking operation, selecting and presenting a second subset of items based at least in part on the locked unambiguous metadata term, and presenting the second subset of items.

Under another aspect of the invention, the unambiguous metadata term locked in fixed relation to the at least one of the ambiguous keystrokes is one of the presented metadata terms associated with the selected item of the first subset. The locked metadata term lexically disambiguates the items of the first subset from each other for the subsequent selecting and presenting step.

Under a further aspect of the invention, the unambiguous metadata term locked in fixed relation to the at least one of the ambiguous keystrokes is a metadata term describing a concept associated with the selected item of the first subset. Only items associated with the concept of the selected item are selected and presented in the subsequent selecting are presenting step.

Under yet another aspect of the invention, the method also includes receiving a browse action from the user for highlighting one of the presented items of the first subset. In response to the user browse action, the method transforms at least part of the ambiguous keystrokes into at least one unambiguous metadata term associated with the highlighted item At least some of the characters of the unambiguous metadata term match the alphabetical and numerical symbols in fixed association with the ambiguous keystrokes entered by the user.

Under a still further aspect of the invention, the receiving a selection of one of the items of the first subset of items includes receiving a browse action from the user for highlighting one of the presented items of the first subset. In addition, receiving a locking operation from the user includes receiving at least one additional keystroke entry from the user.

Under another aspect of the invention, the at least one additional keystroke entry from the user is a keystroke for performing an explicit lock operation.

Under yet another aspect of the invention, the at least one additional keystroke entry from the user includes additional ambiguous keystrokes entered by the user for providing additional alphabetical or numerical symbols for searching for desired items.

Under a further aspect of the invention, systems including logic for performing the methods above are provided.

BRIEF DESCRIPTION OF THE DRAWINGS

For a more complete understanding of various embodiments of the present invention, reference is now made to the following descriptions taken in connection with the accompanying drawings in which.

DETAILED DESCRIPTION

Figure 1:
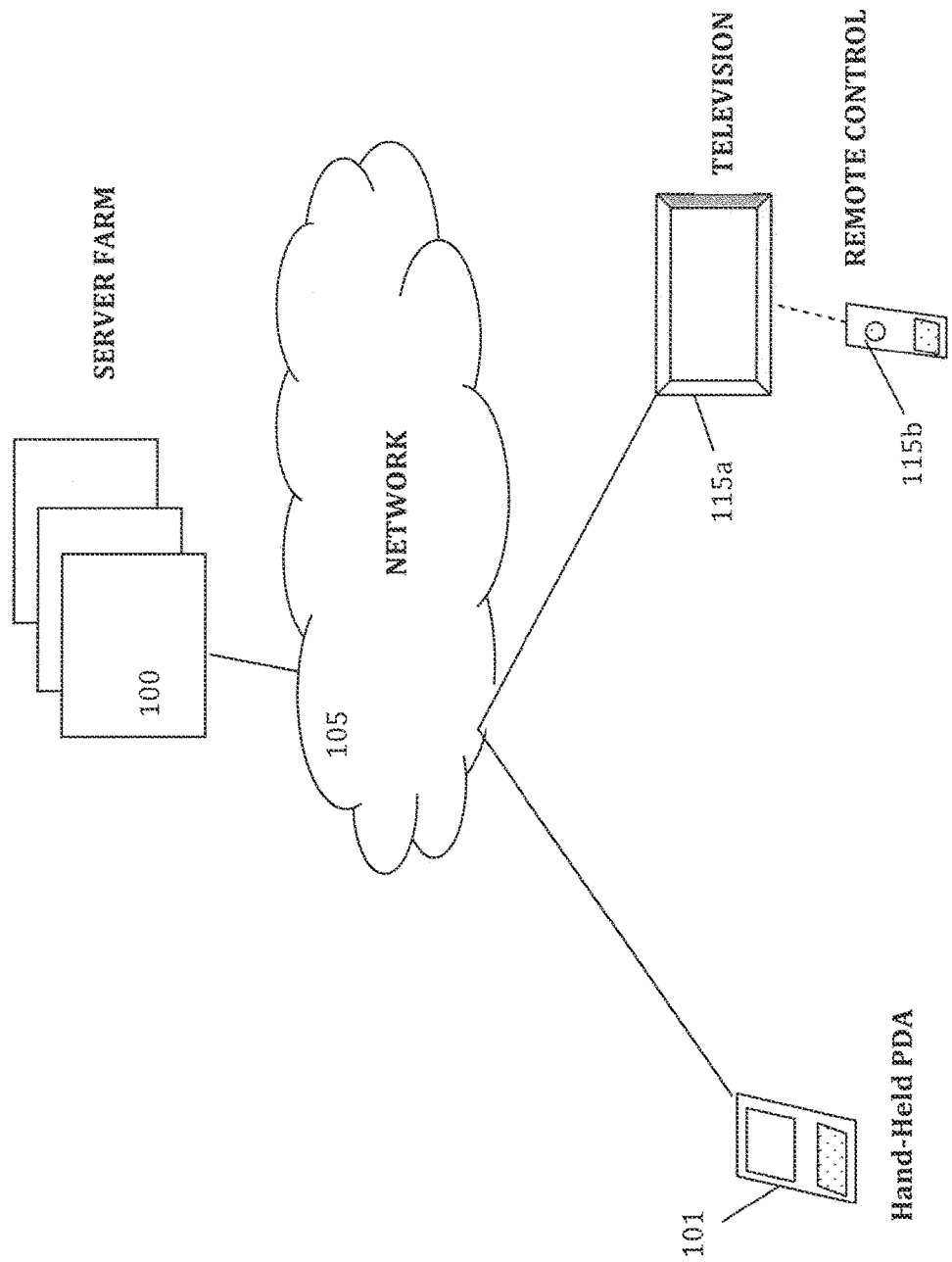
FIG. 1 is a network diagram that illustrates the various components of a search system, according to certain embodiments of the invention.

Embodiments of the invention described here enable a user to disambiguate otherwise ambiguous and/or incomplete text query entries based on terms and metacontent associated with search results that are determined by a search engine to be relevant to the user's query input. A user interface incorporating the techniques disclosed herein can use an ambiguous keypad (e.g., a keypad with overloaded keys) or an unambiguous keypad to receive a search query input from a user. The input query symbols may be, for example, single numeric characters (e.g., on an ambiguous keypad) or single text-alphabet characters (e.g., on an unambiguous QWERTY keypad). Embodiments of the invention can also be used with incremental search techniques, in which results are retrieved as each character is typed.

Techniques for selecting a set of results responsive to the user's query include, but are not limited to, those disclosed in U.S. patent application Ser. No. 11/235,928, entitled Method and System For Processing Ambiguous, Multi-Term Search Queries, filed Sep. 27, 2005, U.S. patent application Ser. No. 11/136,261, entitled Method and System For Performing Searches For Television Content Using Reduced Text Input, filed May 24, 2005, and U.S. patent application Ser. No. 11/246,432, entitled Method and System For Incremental Search With Reduced Text Entry Where The Relevance of Results is a Dynamically Computed Function of User Input Search String Character Count, filed Oct. 7, 2005, all of which are herein incorporated by reference. Similarly, lists of relevant results can be displayed using techniques disclosed in U.S. patent application Ser. No. 12/123,940, entitled Method and System for Search with Reduced Physical Interaction Requirements, filed on May 20, 2008, incorporated by reference herein.

While the user is composing a text query on an ambiguous keypad, the user's query, in general, can be said to be ambiguous (in the sense of the symbol being from an overloaded numeric keypad, where each key corresponds to a set containing more than one character, as is standard in cellular telephones) as well as incomplete (in the sense that one or more words in the query could be incomplete). For an illustration of ambiguous and incomplete queries and query-words, consider the following example. Suppose that the user's intended complete and unambiguous query is "engelbert humperdinck biggest hit." An incomplete but unambiguous version of the same query is "engel hump bigg hit" because the first three query-words in the latter query are prefixes of the respective first three query-words in the complete and unambiguous query. Similarly, an incomplete as well as ambiguous version of the same query would be entered by pressing the keys labeled "36435 4867 2444 448" (assuming this query is entered using a standard numeric keypad of the kind commonly found in telephones and/or television remote controls) because the query-words "36435," "4867," and "2444" are prefixes of the numeric versions of the first three query-words in the complete and unambiguous query. The words "humpback" and "humperdinck" both match the incomplete query-word "hump," because "hump" is a prefix of both the words. The words "humpback" and "humperdinck" both match the ambiguous and incomplete query-word "4867," because "4867" is an ambiguous prefix of the complete and ambiguous query-words "48672225" and "48673734625" (which match "humpback" and "humperdinck," respectively).

Preferred embodiments of the present invention address several usability problems. First, preferred embodiments allow users to press each key only once to enter a specific character, even if the key is associated with multiple characters (as on an overloaded keypad). Second, preferred embodiments permit users to type only a partial prefix of each search term. Finally, preferred embodiments allow for the progressive refinement of search queries in a context-sensitive way.

The techniques described herein provide methods for partially automated completion, disambiguation, and progressive refinement of search queries by using an iterative search-browse-select process. In most cases, this approach reduces the number of steps in reaching the desired result, by eliminating separate disambiguation and context-narrowing steps.

In a preferred embodiment of the present invention, the query system maintains four entities in a computer-readable data structure. The search-query is a data structure that contains the contents of the query input box in the user interface. The clone-query is a secondary query storage structure that allows the restoration of previous queries after the primary search-query has been changed. Unlike the search-query, the contents of the clone-query are not directly displayed to the user; this data structure is maintained by the search system for internal use. The context-list is a data structure that contains information that is used to limit the search space from which the search system will retrieve results. Finally, the result-list is a data structure that holds the results that the system has determined are relevant to the user's query and query context. The manipulation and use of these four structures is described in greater detail below.

The search-query contains a set of query terms, which may be either direct-input query terms or locked query terms. Direct-input query terms are those query terms (that could be incomplete and/or ambiguous) that have been input by the user using the keypad. Locked query-words are query terms that have been placed into the search-query automatically as a result of a "lock" operation. Lock operations are described in greater detail below, but in general, a locked query term is a word that the user interface has put into the search-query in place of a user-entered ambiguous and/or incomplete query term portion. These locked query terms can come from metacontent associated with a particular search result returned by a search engine.

FIG. 1 illustrates the various components of a search system, according to certain embodiments of the invention. A server farm [100] serves as a source of search data and relevance updates with a network [105] functioning as the distribution framework. The distribution framework might be a cable television network, a satellite television network, an IP-based network, or any other type of widely-used networking framework. It may be a wired network or a wireless network, or a hybrid network that uses both of these communication technologies. The search devices are preferably hand-held devices with limited display and input capabilities, such as a hand-held PDA [101], a remote control [115b] that interfaces with a television [115a], or any other input- and output-constrained mobile device (e.g., a cellular phone).

Figure 2:
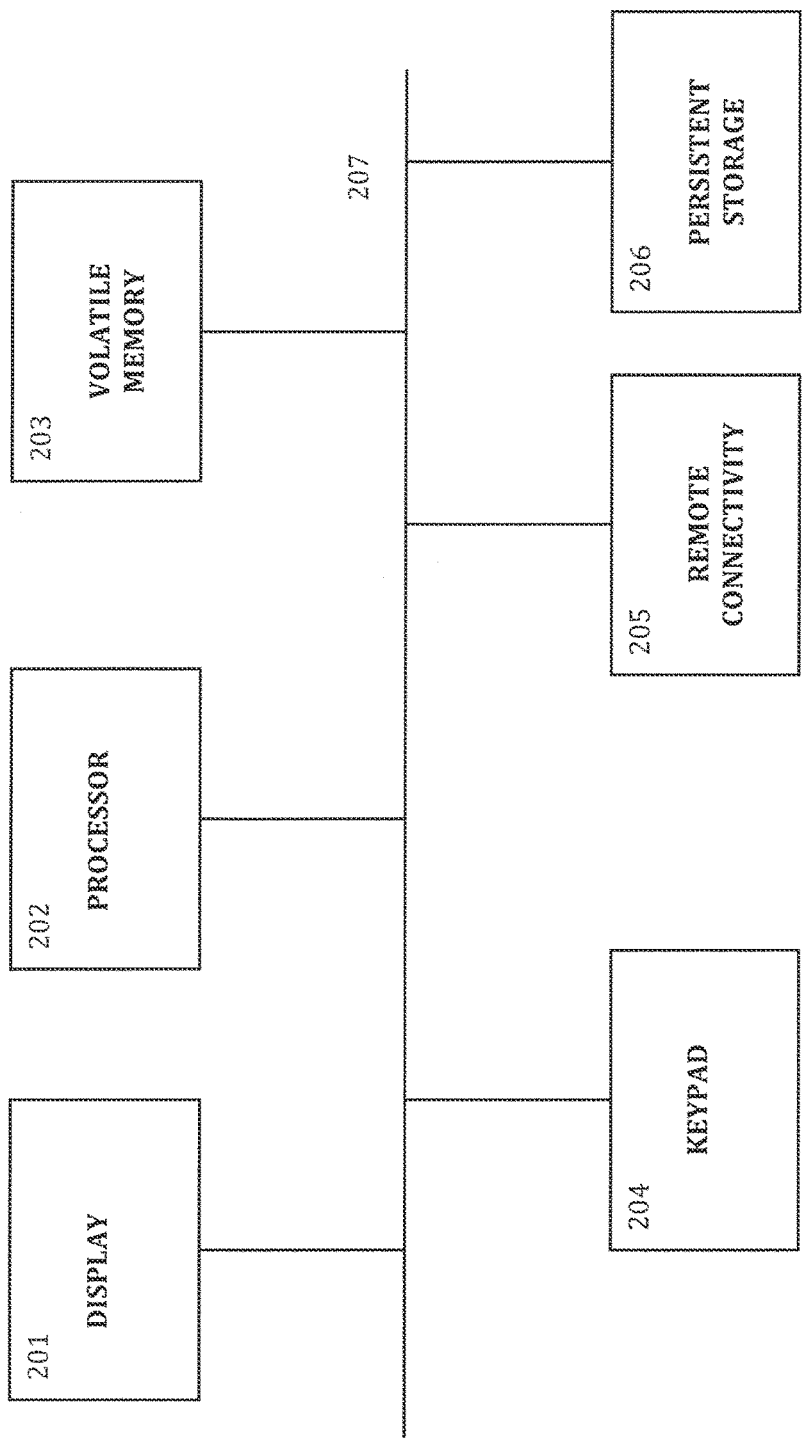
FIG. 2 is a schematic diagram that depicts the various components of a user device, according to certain embodiments of the invention.

FIG. 2 is a diagram that depicts the various components of a user device, according to certain embodiments of the invention. The user device communicates with the user via a display [201] and a keypad [204]. This keypad may be an overloaded keypad that produces ambiguous text input. Computation is performed using a processor [202] that stores temporary information in a volatile memory store and persistent data in a persistent memory store [206]. Either or both of these memory stores may hold the computer instructions for the processor to perform the logic described herein. The device is operable to connect to a remote system using a remote connectivity module [205].

Figure 3:
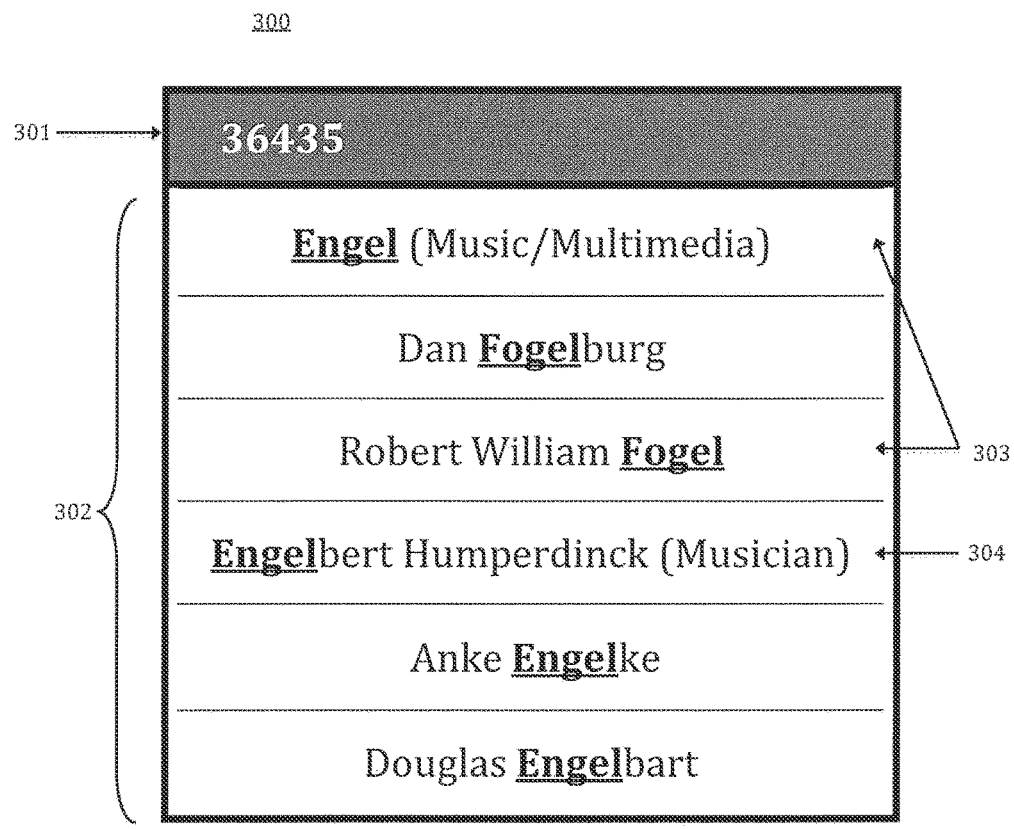
FIG. 3 is a user-interface diagram that depicts the various components of the search interface, according to certain embodiments of the invention.

FIG. 3 is a user-interface diagram that depicts the various components of the search interface, according to certain embodiments of the invention. Box [300] represents the screen of the user device. At the top of the screen is the query input box [301]. As described above, the query input box displays the current contents of the search-query data structure. In FIG. 3, the search-query consists of the ambiguous query term corresponding to the keystrokes "36435" on an overloaded telephone-style keypad, where each number key is associated with multiple characters. The portion [302] of the screen below the query input box [301] is used to display the contents of the result-list. If the result-list is empty, no results are displayed. Otherwise, this portion of the screen [302] is subdivided into rows [303], each of which displays information about a particular search result. In addition to the title of the result, this information may include metadata relevant to the result. In fact, the title of the result is itself only one example of metadata relevant to the result. For example, in FIG. 3 the words "(Music/Multimedia)" appear next to "Engel" in order to provide additional context to the user. The user may use a keyboard navigation interface to browse through the result-list. When the user navigates to a particular row, that row is highlighted. When none of the rows are selected, the query input box is highlighted (illustrated in FIG. 3 as a shaded background with white text [301]).

As described above, the techniques described herein may be used with devices that have overloaded keypads. In FIG. 3, the ambiguous and incomplete search term "36435" has been entered using an overloaded numeric telephone keypad. Using the techniques described in the patent applications referenced above, the system may automatically generate various completions and disambiguations of the search query. In this example, bath "engel" and "fogel" are selected as possible disambiguations of "36435," and the set of suggested completions includes "Fogelburg," "Engelbert," and "Engelke," among others. The portion of the suggested completion that matches the ambiguous query term is here shown in boldface and underlined.

Figure 4:
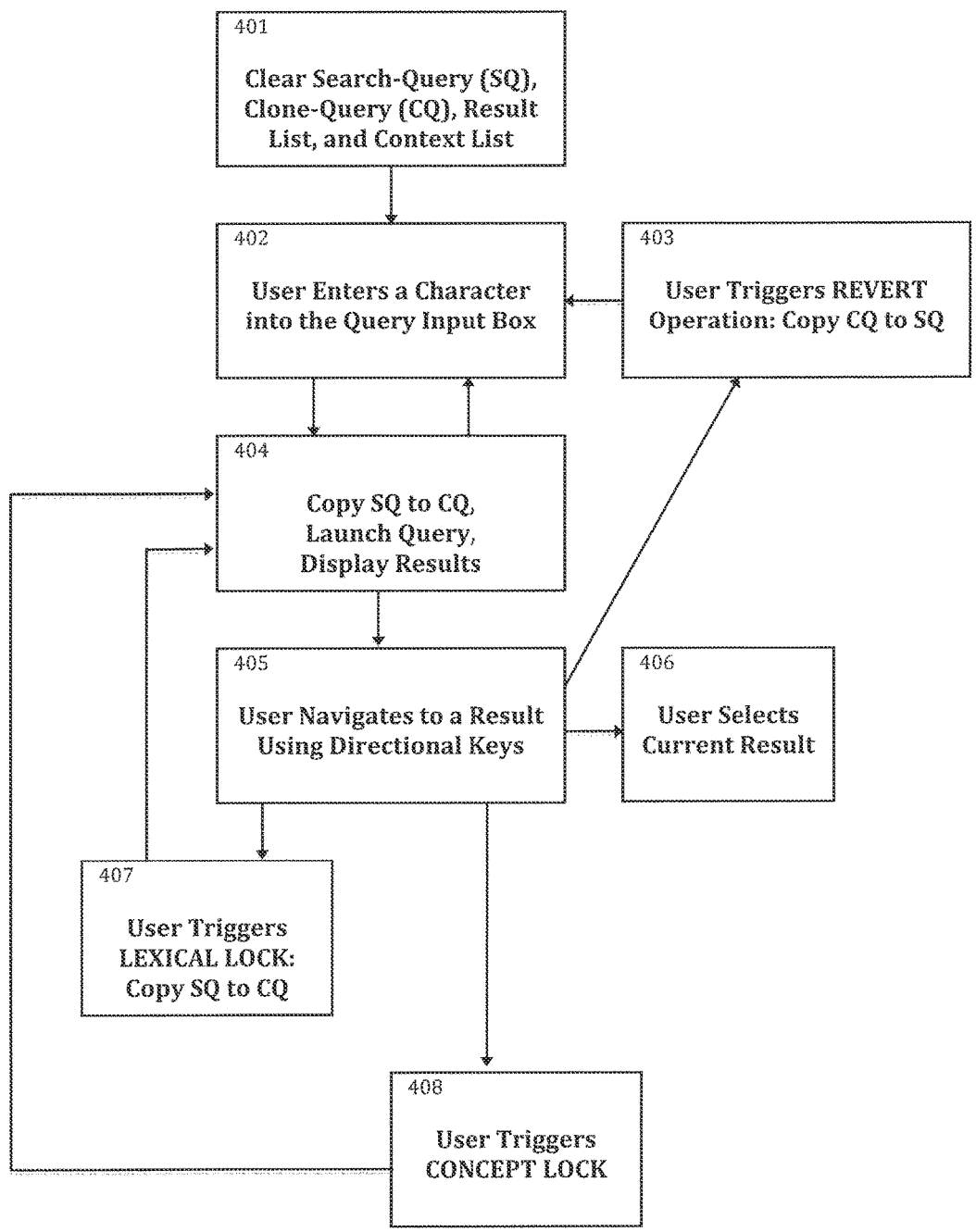
FIG. 4 is a flowchart that illustrates the operation of a search system, according to certain embodiments of the invention.

FIG. 4 is a flowchart that illustrates the operation of a search system, according to certain embodiments of the invention. When the system is initialized, the search-query, the clone-query, the result-list, and the context-list are empty [401]. Although not shown in FIG. 4, the search interface optionally provides means for the user to return to this initial state at any time during the search process. At this point, the system waits for the user to begin searching by entering [402] a character into the query input box [301]. After the user enters a character, it is added to the search-query. If the rightmost query term in the search-query is a direct-input query term, the character is appended to this query term. The user may begin entering a new direct-input query term by inserting a space (or any other appropriate delimiter). Following the user's character entry, the new search-query is optionally submitted to the search engine [404], without requiring the user to explicitly launch the query. At this point, the contents of the search-query are copied to the clone-query, and the results of the search are displayed [404].

At this point, the user may enter another character to further refine the search query [402] or navigate [405] to one of the displayed results [304]. When the user navigates to a displayed result, the result is highlighted, and the incomplete or ambiguous terms in the search-query are synchronized to the highlighted result. In the context of FIG. 3, the user's navigating to the "Engelbert Humperdinck" result [304] would cause the search query to change from "36435" to "Engelbert Humperdinck," Only the search-query is synchronized to the highlighted result; the clone-query remains unchanged. If the user navigates to a different result, the search-query is restored from the contents of the clone-query and re-synchronized to the newly highlighted result. The process of synchronization is described in more detail below.

Having navigated [405] to a search result, the user is presented with four options. First, if desired, the user may select the highlighted result [406]. In preferred embodiments, selecting the result might instruct the system to retrieve the associated document and open it using an appropriate application. For example, depending on the type of result selected, the system might retrieve and open it using a web-browser, a video player, a text reader, etc.

Second, the user may trigger a REVERT operation [403]. This option will cause the contents of the clone-query to be copied into the search-query, restoring it to its original state. Also, it will un-highlight the currently highlighted result and more the input focus back to the query input box. Thus, a REVERT operation returns the search interface to the state it was in before the user navigated to a specific search result [405].

Third, the user may trigger a LEXICAL LOCK operation [407]. The user may perform a LEXICAL LOCK in order to accept the synchronized search-query and launch a new query using the disambiguated terms. This option will cause the contents of the search-query to be copied into the clone-query. After this occurs, it is no longer possible to restore the initial, ambiguous search-query using a REVERT operation. As described above, navigating to the "Engelbert Humperdinck" result in FIG. 3 would cause the search-query to synchronize to "Engelbert Humperdinck." If, at this point, the user were to trigger a LEXICAL LOCK operation, a new search for the unambiguous term "Engelbert Humperdinck" would be performed, eliminating disambiguations like "Engel" and partial matches like "Fogelburg." The LEXICAL LOCK operation is further described below.

Fourth, the user may choose to trigger a CONCEPT LOCK operation [408]. A CONCEPT LOCK is intended to address situations in which metadata fails to sufficiently distinguish results that represent fundamentally different "concepts." For example, the query terms "Engelbert Humperdinck" might refer to Engelbert Humperdinck the popular singer born in 1936, or they might refer to Engelbert Humperdinck the well-known composer of German Opera who lived in the 19$^{th}$ century. In this case, topical metadata may be unable to distinguish between these two possibilities, since both Engelbert Humperdincks would likely be indexed under terms like "Composer," "Musician," "Singing," etc.

To overcome this problem, search results are manually associated with Global identifiers (GIDs) that correspond to various "concepts." These identifiers make it possible to distinguish between two separate concepts that happen to be associated with similar metadata. For example, Engelbert Humperdinck the singer might be associated with GID 500, while results about Engelbert Humperdinck the composer might have GID 510. Navigating to a result with GID 500 and triggering a CONCEPT LOCK will cause the selected GID (i.e. 500) to be stored in the context-list. Preferably, when launching a query, the system will pass the contents of the context-list to the search engine, thereby ensuring that only results related to GID 500 will be returned. Results about Engelbert Humperdinck the composer, though they may be associated with similar metadata, will not be included in the result-list because they are not associated with GID 500. The synchronization process and the LEXICAL LOCK and CONCEPT LOCK operations are further illustrated below.

Figure 5:
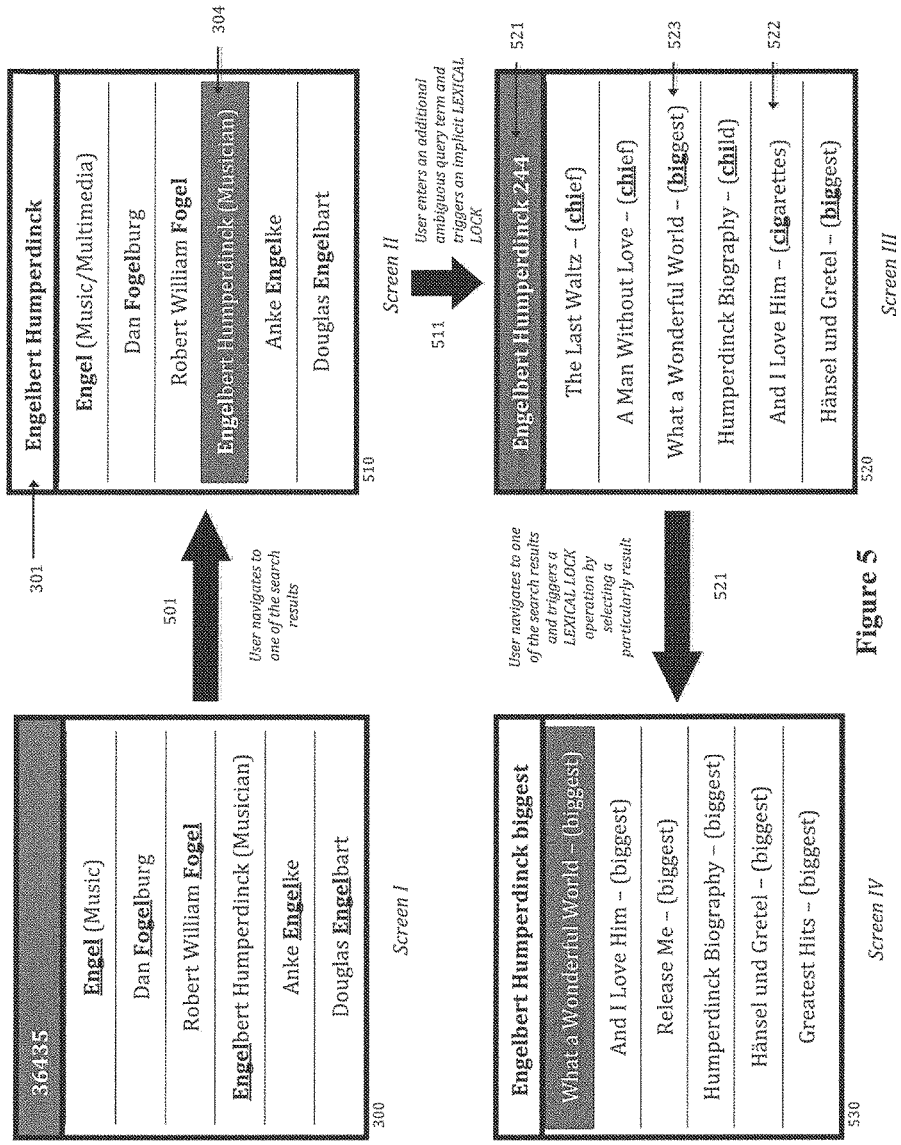
FIG. 5 is a user interface diagram that illustrates the operation of the navigation, synchronization, and LEXICAL LOCK features, according to certain embodiments of the invention.

FIG. 5 is a user interface diagram that illustrates the operation of the navigation, synchronization, and LEXICAL LOCK features described above. Screen I [300] shows the search interface as it appeared in FIG. 3. The user may then use the device's keypad to navigate [501] to the "Engelbert Humperdinck" result. As shown in Screen II [510], this result is highlighted [304], and the search-query (displayed in the query input box [301]) is synchronized to "Engelbert Humperdinck." During the synchronization process, each direct-input query term in the search-query that matches a complete and unambiguous term (or phrase, such as "Engelbert Humperdinck") in the highlighted result's metacontent is removed and the corresponding complete and unambiguous term (or phrase) is put in place of the corresponding direct-input query term as a locked query term. Thus, because "Engelbert Humperdinck" matches "36435," the direct-input query term "36435" is replaced by the locked query term "Engelbert Humperdinck" in the search-query.

Having navigated to the highlighted result [304], the user may enter more ambiguous characters [521]. This automatically moves the focus (i.e., the highlighted item) to the query input box, and the ambiguous characters "244" are added to the end of the search-query. This also performs an implicit LEXICAL LOCK on the query term "Engelbert Humperdinck." The search system automatically launches the new search-query in the search engine and returns results that are related to the locked query term "Engelbert Humperdinck" and the ambiguous query term "244," The state of the interface after this search is shown in Screen III [520]. At the end of each row, the system may optionally display the metadata matched by the ambiguous query term. For example, after the result "And I Love Him" [522], the word "cigarettes" appears in parentheses, indicating that this result was selected because it is associated with "cigarettes," which matches the ambiguous query term "244." Optionally, the portion of the metadata that matches the ambiguous query term may be set-off from the rest of the text. In Screen III [520], the matching portion of the metadata is underlined.

To fully disambiguate the search-query, the user may perform a LEXICAL LOCK operation. In the scenario shown in FIG. 5, the user navigates to the "What a Wonderful World" result and triggers a LEXICAL LOCK [521].

As described above, navigating to the "What a Wonderful World" result causes the search-query to synchronize its direct-input query terms to the corresponding locked query terms. In this case, the direct-input term "244" is synchronized to "biggest." The LEXICAL LOCK operation makes this change permanent, fully disambiguating the search-query; as shown in Screen IV [530].

Figure 6:
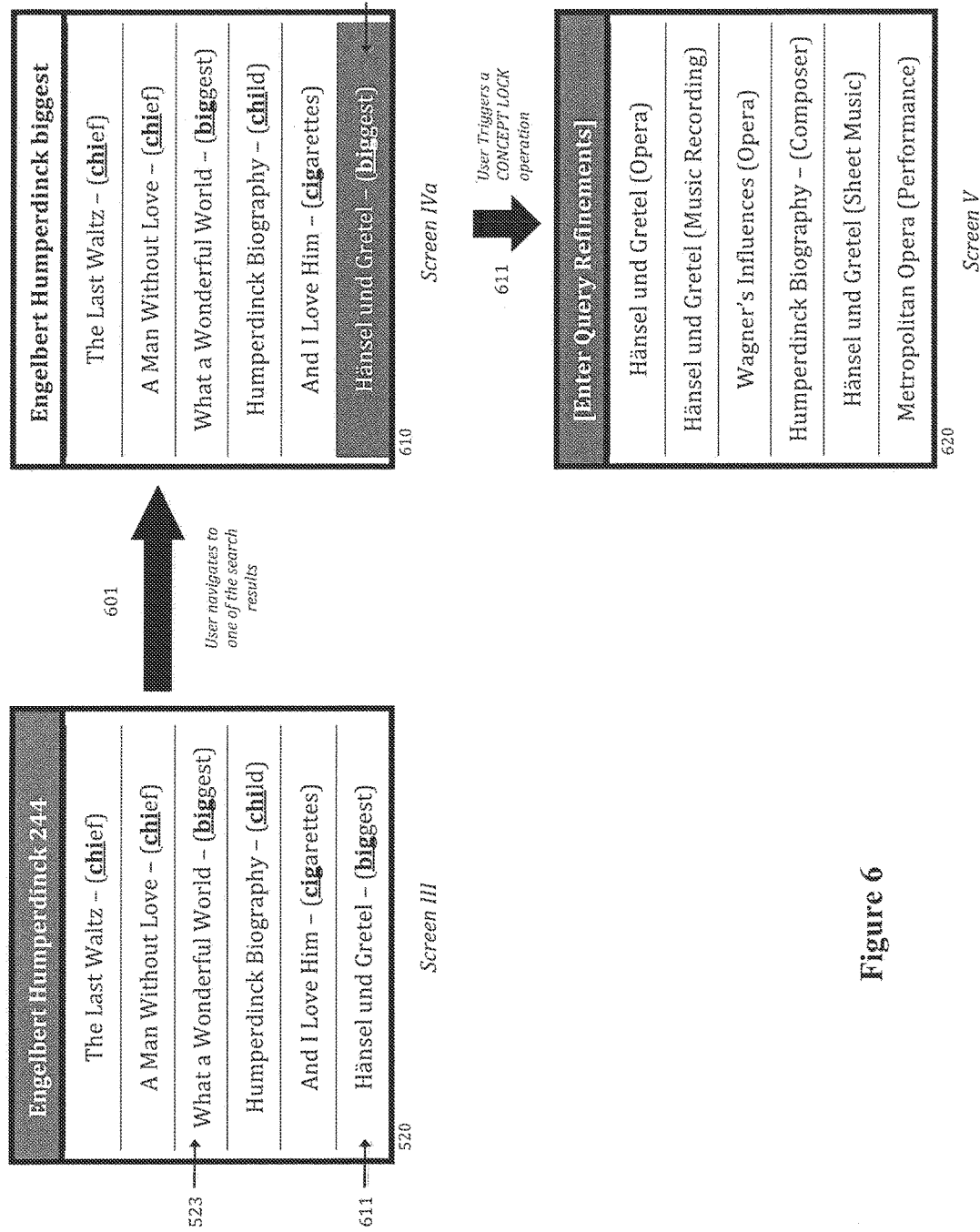
FIG. 6 is a user interface diagram that illustrates the operation of the CONCEPT LOCK feature, according to certain embodiments of the invention.

FIG. 6 is a user interface diagram that illustrates the operation of the CONCEPT LOCK feature. Screen III [520] (identical to Screen III in FIG. 5) lists results that are relevant to the locked query term "Engelbert Humperdinck" and the direct-input term "244." This listing includes terms that are relevant to Humperdinck the popular singer (e.g. "What a Wonderful World" [523], the title of a song performed by Humperdinck) and also terms that are relevant to Humperdinck the German composer (e.g., "Hänsel und Gretel" [611], the name of his most famous opera). As explained above, it is difficult to distinguish between these two concepts using metadata alone. This type of distinction is facilitated by the CONCEPT LOCK operation.

For example, in FIG. 6, suppose the user is searching for results related to Humperdinck the composer and not Humperdinck the singer. In order to narrow the scope of the search to the composer, the user would first navigate to a search result related to the desired concept [601]. In this case, the user selects the result titled "Hänsel und Gretel" [611]. Screen IVa [610] depicts the state of the interface after the user has navigated to this result.

At this point, the user triggers a CONCEPT LOCK [611], which limits the query to concepts related to the selected result. As explained above, search terms may be associated with an arbitrary number of GIDs that correspond to various concepts. When the system performs a CONCEPT LOCK, the GIDs associated with the current result are added to the context-list. For example, performing a CONCEPT LOCK on "Hänsel und Gretel" might add the GID corresponding to the concept "Humperdinck the German Composer" to the context-list. By limiting future searches to this concept, the system is able to filter out unwanted search results about Engelbert Humperdinck the popular singer. CONCEPT LOCK operations may be performed explicitly (e.g., in response to the user pressing a button) or implicitly by the search system.

The database used to associate concept GIDs with search terms may be stored and maintained by either the search engine or the client device. If maintained by the search engine, the client device would submit the current context-list to the search engine together with the search-query. The search engine would then return only those results that are relevant to the concept GIDs contained in the context-list. Alternatively, the client device may maintain a database of GIDs in which each GID is associated with a set of pre-constructed queries. In this case, the client device will send these pre-constructed queries to the search engine along with the search-query in order to limit the search results.

It will be appreciated that the scope of the present invention is not limited to the above-described embodiments, but rather is defined by the appended claims; and that these claims will encompass modifications of and improvements to what has been described.

What is claimed is:
1. A method for searching for an item, comprising:
   receiving a first keystroke sequence that represents a plurality of symbols;
   in response to receiving the first keystroke sequence, comparing the plurality of symbols represented by the first keystroke sequence to information associated with items in a collection of items;

selecting, using control circuitry, a first result set of items in the collection, wherein the information associated with each item in the first result set comprises the plurality of symbols represented by the first keystroke sequence;

generating for display the items in the first result set;

receiving a first user selection of an item in the first result set;

in response to receiving the first user selection of the item in the first result set, automatically obtaining metadata associated with the selected item;

searching metadata associated with the collection of items to generate a second result set of items based on the obtained metadata associated with the selected item, wherein the searching comprises identifying items in the collection that are associated with metadata that comprise the obtained metadata associated with the selected item; and generating for display the items in the second result set.

2. The method of claim 1, wherein automatically obtaining the metadata associated with the selected item comprises:

retrieving, using the control circuitry, from a database a list of specific context identifiers; and selecting one of the specific context identifiers associated with the item selected by the user.

3. The method of claim 2 further comprising:

retrieving a specific context identifier associated with the item selected by the user; and selecting the one of the specific context identifiers by identifying which of the list of specific context identifiers matches the retrieved specific context identifier.

4. The method of claim 1, wherein receiving the first user selection of an item comprises receiving a second keystroke sequence.

5. The method of claim 1, wherein receiving the first user selection of an item comprises:

receiving a user input that navigates through the first result set; and in response to receiving the user input, highlighting the item in the first result set.

6. The method of claim 1, wherein the first keystroke sequence comprises an ambiguous keystroke, and wherein the information includes a word that is associated with the item that matches letters corresponding to the ambiguous keystroke.

7. The method of claim 1 further comprising:

receiving a second user selection of a given item of the second result set; and determining a type associated with a given item selected by the user.

8. The method of claim 7 further comprising:

selecting an application associated with the determined type; and executing the application for presenting the given item in response to receiving the second user selection.

9. The method of claim 1 further comprising:

storing in a database a list of specific context identifiers each associated with a pre-constructed query; and wherein automatically obtaining the metadata associated with the selected item comprises selecting one of the specific context identifiers that is associated with a pre-constructed query that matches the first keystroke sequence.

10. The method of claim 1 further comprising storing the metadata associated with the selected item in a context-list.

11. A system for searching for an item, comprising:

control circuitry configured to:

receive a first keystroke sequence that represents a plurality of symbols;

in response to receiving the first keystroke sequence, compare the plurality of symbols represented by the first keystroke sequence to information associated with items in a collection of items;

select a first result set of items in the collection, wherein the information associated with each item in the first result set comprises the plurality of symbols represented by the first keystroke sequence;

generate for display the items in the first result set;

receive a first user selection of an item in the first result set;

in response to receiving the first user selection of the item in the first result set, automatically obtain metadata associated with the selected item;

search metadata associated with the collection of items to generate a second result set of items based on the obtained metadata associated with the selected item, wherein the searching comprises identifying items in the collection that are associated with metadata that comprise the obtained metadata associated with the selected item; and generate for display the items in the second result set.

12. The system of claim 11, wherein the control circuitry is configured to automatically obtain the metadata associated with the selected item by:

retrieving, from a database, a list of specific context identifiers; and selecting one of the specific context identifiers associated with the item selected by the user.

13. The system of claim 12, wherein the control circuitry is further configured to:

retrieve a specific context identifier associated with the item selected by the user; and select the one of the specific context identifiers by identifying which of the list of specific context identifiers matches the retrieved specific context identifier.

14. The system of claim 11, wherein the control circuitry is configured to receive the first user selection of an item by receiving a second keystroke sequence.

15. The system of claim 11, wherein the control circuitry is configured to receive the first user selection of an item by:

receiving a user input that navigates through the first result set; and in response to receiving the user input, highlighting the item in the first result set.

16. The system of claim 11, wherein the first keystroke sequence comprises an ambiguous keystroke, and wherein the information includes a word that is associated with the item that matches letters corresponding to the ambiguous keystroke.

17. The system of claim 11, wherein the control circuitry is further configured to:

receive a second user selection of a given item of the second result set; and determine a type associated with a given item selected by the user.

18. The system of claim 17, wherein the control circuitry is further configured to:

select an application associated with the determined type; and execute the application for presenting the given item in response to receiving the second user selection.

19. The system of claim 11, wherein the control circuitry is further configured to:
store in a database a list of specific context identifiers each associated with a pre-constructed query; and
wherein control circuitry is configured to automatically obtain the metadata associated with the selected item by selecting one of the specific context identifiers that is associated with a pre-constructed query that matches the first keystroke sequence.

20. The system of claim 11, wherein the control circuitry is further configured to store the metadata associated with the selected item in a context-list.

* * * * *